US007920955B2

(12) United States Patent
Bauer et al.

(10) Patent No.: US 7,920,955 B2
(45) Date of Patent: Apr. 5, 2011

(54) METHOD FOR CHANGING THE OPERATING MODE OF AN INTERNAL COMBUSTION ENGINE

(75) Inventors: Erwin Bauer, Lappersdorf (DE); Dietmar Elllmer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 516 days.

(21) Appl. No.: 12/133,584

(22) Filed: Jun. 5, 2008

(65) Prior Publication Data

US 2008/0306672 A1 Dec. 11, 2008

(30) Foreign Application Priority Data

Jun. 6, 2007 (DE) ........................ 10 2007 026 408

(51) Int. Cl.
*G06F 19/00* (2006.01)
*F02B 17/00* (2006.01)

(52) U.S. Cl. ......... 701/103; 701/113; 701/115; 123/295

(58) Field of Classification Search ................ 123/27 R, 123/295, 299, 300, 304, 305, 430, 431, 435, 123/478, 480, 491; 701/101-103, 110, 111, 113, 115
See application file for complete search history.

(56) References Cited

U.S. PATENT DOCUMENTS

| | | | | |
|---|---|---|---|---|
| 5,168,853 | A * | 12/1992 | Kittelson et al. | 123/406.23 |
| 5,243,527 | A * | 9/1993 | Kroger | 701/101 |
| 5,425,335 | A * | 6/1995 | Miyamoto et al. | 123/198 F |
| 6,644,272 | B2 * | 11/2003 | Furukawa et al. | 123/378 |
| 6,745,743 | B2 * | 6/2004 | Abo et al. | 123/295 |
| 7,073,466 | B2 * | 7/2006 | Bauer et al. | 123/27 R |
| 2004/0011330 | A1 * | 1/2004 | Sauler et al. | 123/406.21 |

FOREIGN PATENT DOCUMENTS

EP 1365134 11/2003

* cited by examiner

*Primary Examiner* — Willis R Wolfe, Jr.
(74) *Attorney, Agent, or Firm* — King & Spalding L.L.P.

(57) ABSTRACT

In a method for changing the operating mode in an internal combustion engine it is possible to switch between an operating mode with spark ignition of the engine and an operating mode with auto-ignition of the engine. Hereby, a first map is provided in which at least one range is specified in which a suitable auto-ignition of the engine can take place. After the engine start, therefore, it is determined whether the engine has reached an operating point lying within this range of the first map in order then to switch the engine to the operating mode in which auto-ignition can take place reliably.

20 Claims, 2 Drawing Sheets

FIG 2

Druckverlaufsanlyse am Beispiel des CAI-Prozesses

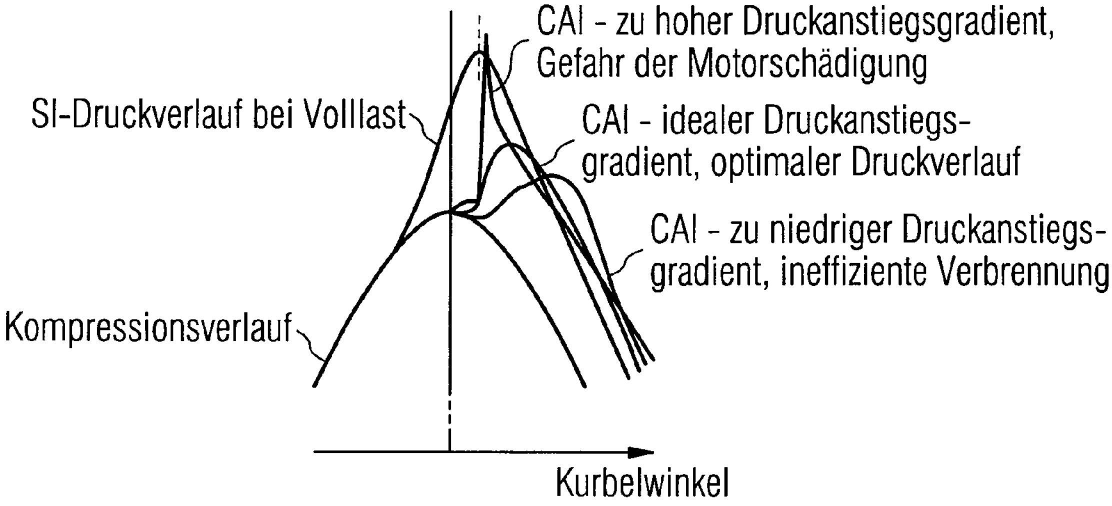

Ergebnis

| | |
|---|---|
| zu hoher Druckanstiegsgradient<br>zu früher Verbrennungsstart | zu niedriger Druckanstiegsgradient<br>zu später Verbrennungsstart |

Maßnahmen

| | |
|---|---|
| - Erhöhung der Abgasrückführrate | - Verringerung der AGR-Rate |
| - Verringerung der Voreinspritzmenge | - Erhöhung der Voreinspritzmenge |
| - Abkühlung der Ansaugluft | - Zündunterstützung durch Zündkerze |
| - Erhöhung der Einblasemenge des Lufttaktventils | - Verringerung der Lufteinblasemenge |
| - ... | - ... |

METHOD FOR CHANGING THE OPERATING MODE OF AN INTERNAL COMBUSTION ENGINE

CROSS-REFERENCE TO RELATED APPLICATIONS

This application claims priority to German Patent Application Number 10 2007 026 408.0 filed on Jun. 6, 2007, and which is incorporated herein by reference in its entirety.

TECHNICAL FIELD

The invention relates to a method for changing the operating mode of an internal combustion engine from an operating mode with spark ignition of the engine into an operating mode with auto-ignition of the engine.

BACKGROUND

Modern internal combustion engines can be operated in different combustion modes. One example to mention is a change between a stoichiometric spark-ignited homogenous mode and a lean stratified-charge mode or the controlled auto-ignition method (CAI method). The latter is characterized by the fact that a lean homogeneous air-fuel mixture is brought to auto-ignition in a controlled way without producing significant NOx emissions at the same time. The ignition is initiated by hot exhaust gas retained in the cylinder and the increase in pressure and temperature during the compression phase. It is obvious that the fuel quality plays an important role in the respective combustion method. This relates in general to the position and size of the operating range of a combustion method, in particular the combustion control and hence the fuel consumption and the engine's emission behavior.

Known from the prior art, such as that disclosed in U.S. Pat. No. 7,073,466 is a method for regulating a combustion process of an HCCI internal combustion engine. Hereby, the internal combustion engine can be operated at least in certain operating modes with controlled auto-ignition (HCCI mode). In controlled auto-ignition, an actual combustion process and a modeled combustion process are continuously compared to each other with the difference between output variables of the actual combustion process being referred to the modeled combustion process and traced according to this process.

SUMMARY

According to an embodiment, a method for changing the operating mode of an internal combustion engine from an operating mode in which a spark ignition of the engine takes place into an operating mode in which auto-ignition of the engine takes place, may comprise the steps of: a) providing a first map in which at least one range is specified in which auto-ignition of the engine can take place, b) determining whether, after an engine start, the engine reaches an operating point lying in the range of the first map, in which a controlled auto-ignition can take place, and c) switching the engine to the operating mode, in which the auto-ignition can take place when the operating point lies in this range of the first map.

According to a further embodiment, in the first map, the range for the operating mode in which auto-ignition of the engine can take place may be selected in such a way that an operating point of the engine in this range ensures sufficient switchover reliability and optionally comprises a stable engine operation for a predetermined fuel quality range.

According to a further embodiment, after refueling a vehicle, the fuel quality of the fuel in the tank can be determined in dependence on the quantity and quality of the newly filled fuel and any residual fuel in the tank. According to a further embodiment, a switchover into the operating mode in which auto-ignition of the engine can take place, may take place under the aspect of the driving comfort, for example with a load change which is virtually, or substantially completely imperceptible to the driver. According to a further embodiment, a coarse adjustment of at least one or more operating parameters may take place when an operating point of the engine falls within the range of the first map in which a controlled auto-ignition of the engine can take place. According to a further embodiment, the coarse adjustment of the operating parameters may take place for example on the basis of the antiknock properties of the fuel, the volatility of the fuel, the fuel quality in the tank after a refueling process, the idle time of the vehicle, the ambient temperature, the time since the last switchover process and/or the range for operating points in which a controlled auto-ignition is possible with it being possible to derive these data for example from the operating mode with spark ignition. According to a further embodiment, a reference map can be provided for at least one reference fuel with a data supply, preferably substantially a complete data supply, from operating ranges of at least one or substantially all operating modes in order to draw conclusions regarding the fuel quality of the fuel in the tank. According to a further embodiment, a pressure curve analysis can be performed after the engine has switched to the operating mode in that auto-ignition of the engine can take place. According to a further embodiment, in the first combustion or in several of the first combustions after the switchover into the operating mode in which auto-ignition of the engine can take place, the pressure course, the pressure gradient, the ignition point, the acoustic behavior, the combustion duration and/or the emissions can be determined in order to draw conclusions therefrom for example regarding the fuel quality or fuel properties. According to a further embodiment, a fine adjustment of at least one or more operating parameters may take place after the engine has switched to the operating mode in that auto-ignition of the engine can take place. According to a further embodiment, during the fine adjustment of at least one or more operating parameters, the idle time of the vehicle, the ambient temperature and/or the time since the last switchover process may be taken into account. According to a further embodiment, as operating parameters in the coarse adjustment and/or the fine adjustment for example, the following operating parameters can be adjusted, including the adjustment of the injection timing and the injection quantity, the lambda variation, the adjustment of the exhaust gas recirculation rate, the adjustment of the prehomogenization in the intermediate compression, the adjustment of the ignition point, the ignition support by at least one or more spark plugs during the auto-ignition, the intake-air preheating and intake-air precooling, the adjustment of the control times of variable valve gears and the control of air pulse valves. According to a further embodiment, a current operating point at which a fine adjustment of at least one operating parameter may have taken place and at which auto-ignition of the engine can take place is validated and stored in a second map. According to a further embodiment, the fuel quality and/or fuel composition can be determined online for the adjustment of operating parameters of operating points during driving and stored in corresponding maps in the engine control system so that a corresponding operating range for a existing fuel can be created. According to a further embodiment, a changeover to the operating mode in which auto-ignition of the engine can take place can only take place in a validated operating point or an operating point which falls in a pre-specified range in which auto-ignition of the engine can take place. According to a further embodiment, the operating mode in which auto-ignition can take place may be, for example, a CAI operating mode.

According to another embodiment, an internal combustion engine which can be switched at least between an operating mode with spark ignition of the engine and an operating mode with controlled auto-ignition of the engine may be operated with a method as described above.

BRIEF DESCRIPTION OF THE DRAWINGS

The invention will now be explained in more detail with reference to an embodiment in the attached drawings, which show.

DETAILED DESCRIPTION

Figure 1:
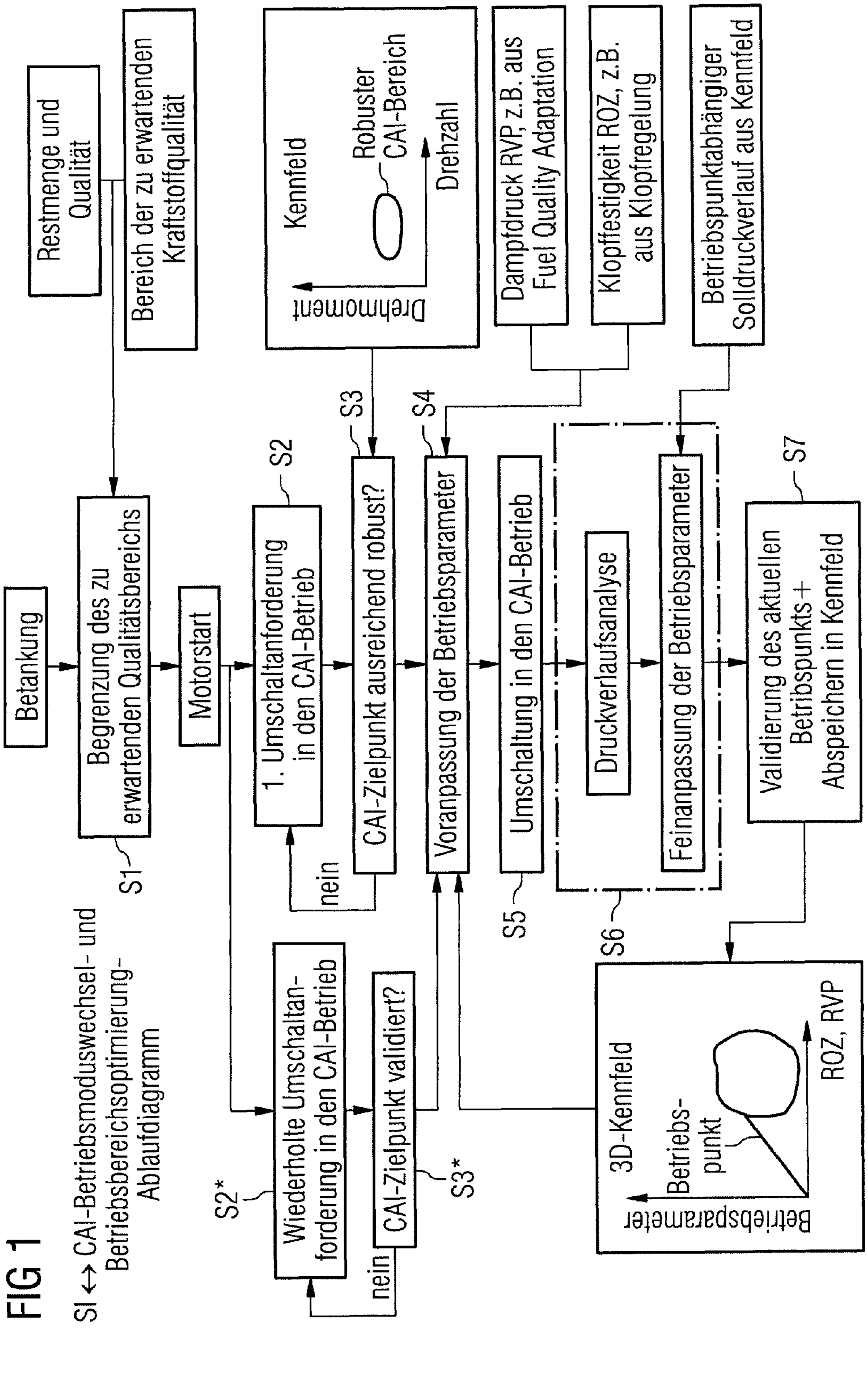
FIG. 1 a flowchart of a engine control system according to an embodiment, and FIG. 2 a pressure curve analysis using the example of a CAI process.

According to an embodiment, in a method for changing the operating mode in an internal combustion engine in which it is possible to switch between an operating mode with spark ignition of the engine and an operating mode with auto-ignition of the engine, a first map is provided in which at least one range is specified in which a suitable auto-ignition of the engine can take place. After the engine start, it is therefore determined whether the engine has reached an operating point lying within this range of the first map in order then to switch the engine to the operating mode in which auto-ignition can take place reliably. This has the advantage that the engine can be switched at a early point in time to the operating mode with auto-ignition since for this a map is used comprising at least one range in which controlled auto-ignition of the engine can take place reliably. If instead, the switchover only takes place when, for example, a knock control system supplies reliable information on the fuel quality of the vehicle, as was normally the case in the prior art, with appropriate driving behavior, under some circumstances, this may take a very long time because the engine is not being operated in a knock-relevant operating range. As a result, under some circumstances, valuable potential can be lost due to the non-activated alternative operation. By contrast, the method according to an embodiment does not require the information from the knock control system for a first switchover into the operating mode with auto-ignition after the start of the engine.

In one embodiment, in the first map, the range for the operating mode with auto-ignition may be selected so that an operating point of the engine in this range ensures sufficient switchover reliability and provides a stable engine operation for a predetermined fuel quality range. Hereby, the fuel quality range can be selected so that hereby the commonly used fuels are covered. This has the advantage that it ensures reliable auto-ignition of the engine even with poorer fuel qualities. Preferably, the switchover to the operating mode with auto-ignition is hereby set so that the driving comfort for a driver is not impaired.

In a further embodiment, first a coarse adjustment of operating parameters may take place when the operating point falls within a range in which auto-ignition of the engine is possible. The coarse adjustment can take into account different output variables to use as a basis for a suitable adjustment of the operating parameters. This has the advantage that, after the switchover to the operating mode with auto-ignition of the engine, operating parameters are present in advance which have been optimized to such a degree as the output variables known at time permit. Such output variables are, for example, the antiknock properties and volatility and the quality of the fuel etc. Hereby, for example, a map for a reference fuel can be used to draw conclusions regarding the fuel available.

According to further embodiment, after the switchover into the operating mode with auto-ignition of the engine, a pressure curve analysis and a fine adjustment of the operating parameters may take place. This has the advantage that the pressure curve analysis enables, for example, more selective conclusions to be drawn regarding output variables, such as for example the fuel quality, the pressure gradients etc. and the operating parameters to be adjusted more precisely in accordance with said variables.

The method according to an embodiment is described in the following using the example of the (sensitive) CAI combustion process, wherein, however, the method can also be applied to combustion modes. The CAI process is sometimes referred to as the HCCI mode (homogenous charge compression ignition), ATAC (active thermo atmosphere combustion) or TS (Toyota Soken).

Modern engine control systems include functions such as the knock control system and the fuel quality detection (engine run-up evaluation, determination of evaporation temperature). The present invention encompasses this prior art and provides significant innovations with respect to the control of the combustion process. Hereby, for the first time the focus is on switchovers between a homogeneous SI (spark ignited) combustion process and an alternative combustion method after a refueling process in respect, for example, of comfort and emission neutrality, which cannot be provided adequately by the development according to the prior art.

FIG. 1 shows a flowchart of an embodiment of the method for controlling the change of the operating mode in an internal combustion engine. The internal combustion engine can hereby be any type of a suitable internal combustion engine. The method according to an embodiment only commences on the refueling of the vehicle. Hereby, before the refueling, the tank can be substantially empty or also contain a residual quantity of fuel to which new fuel is added. Hereby, the quality of the fuel in the tank is determined or a range of fuel quality is estimated.

Since the fuel composition depends inter alia on the crude oil quality and the respective refinery process, there is only a limitedly precise chemical definition of gasoline which is delimited by DIN regulations. In addition, gas stations in regions with extreme seasonal temperature fluctuations are supplied with different types of fuel over the course of the year, namely highly volatile winter fuel and less volatile summer fuel. Certain parameters are used to specify the fuel quality. These include, the research octane number RON, the motor octane number MON, the cetane number and the vapor pressure RVP (Reid vapor pressure). The research octane number RON describes the uncontrolled ignition performance of the fuel in respect of the antiknock properties. The cetane number, which is usually used to describe diesel fuels or a variable based on this, can also be used with gasoline to describe the possible behavior on the initiation of auto-ignition in respect of the ignition behavior. To create comparable conditions, during the development phase of an engine or an engine control system, reference fuel with a known fuel quality or composition is used to supply the map data. According to various embodiments, for example a data supply, preferably a complete data supply, of the operating range of several or one combustion operation mode(s) is provided for at least one or more reference fuels. However, when driving in practice, it should be assumed that, in addition to the reference fuel, the refueling may entail other, in particular poorer, fuel qualities. For example, a research octane number (RON) range of approximately 90 to 100 may be expected in Europe. In particular, in CAI mode, this difference has a significant impact on the ignition point.

An example will now be used to describe in more detail a case in which there is a residual quantity of fuel in the tank. Hereby, the tank capacity is for example 80 L and there is a residual quantity of 40 L of fuel in the tank of which it is known that this fuel has, for example, a research octane number RON 95. Now, for example, 40 L of new fuel is added to this residual quantity of fuel with the precise quality of this fuel not being known. In order to determine the quality of all the fuel in the tank in Step S1 at least in a first approximation, first an assessment is made of the range in which the quality of the newly filled fuel normally lies. As stated above, for the fuels normally used in Europe, the quality of this fuel, is normally, for example, in a range of from 90 to 100 octane. However, in principle, the invention is not restricted to this range, but the range should, for example, be selected in such a way that it at least substantially covers the range of normally used fuels.

For the octane rating, after refueling, the entire quantity of fuel in the tank has a fuel quality or octane rating in a range of from 92.5 to 97.5 octane. Hereby, the residual fuel and the newly added fuel are considered proportionally. In this way, the known quality of the fuel in the tank before the refueling process is also included and taken into account in a proportionate mixing ratio so that the quality of the fuel contained in the tank can be estimated more precisely. If, in the case described above, the tank were substantially empty before refueling, the quality of the fuel added to the tank would be unchanged in the assumed range of from 90 to 100 octane. In this way, therefore, in Step S1, after the refueling, firstly limits are placed on the range in which the quality of the fuel in the tank of the vehicle lies. One possibility is now completely to block the change to the alternative operating mode, i.e. the CAI operating mode with controlled auto-ignition, and to run the engine exclusively in the homogeneous SI operating mode (spark ignition of the engine). Hereby, the change of operating mode can only be released when, for example, the knock control system has provided reliable information with regard to the fuel quality. As described above, with the appropriate driving behavior, under some circumstances, this can take a very long time. One possibility according to an embodiment now consists in not prohibiting the change of operating mode after the refueling and then waiting for reliable information from the knock control system. Instead, it is first determined in Steps S2 and S3 whether the vehicle or the engine can be switched to a CAI operating mode. For this, in Step S3, a first map is used to determine whether the vehicle or the engine has reached an operating point in which the CAI operating mode can take place reliably.

Therefore, after the engine start, instead of blocking a switchover to CAI operating mode and waiting for the result from the knock control system, a first switchover to CAI operating mode takes place in a range which is stored as a minimum operating range in a first map and, for example, identifies a sufficient degree of switchover protection and preferably an engine operation which is substantially expected to be stable. Hereby, an engine operation which is expected to be stable should exist for example for the minimum and maximum value of the expected fuel quality, that is for example at 90 to 100 octane. This means the target operating point to be expected after the change of operating mode is, for example, so robust that all usual fuel qualities are also reliably ignited and produce the desired combustion course. Preferably, the first switchover takes place in this target range at a load point change which is non-critical in respect of the expected comfort for the driver. This has the advantage that the switchover to the CAI operating mode is, with a high degree of certainty, unremarkable with respect to the driver's expectations or virtually imperceptible to the driver.

The first map which is used to determine whether the engine has an operating point in a robust CAI range (Step S3) is shown in FIG. 1. In the first map, the operating point or the range of operating points of the robust CAT range is shown in dependence on the torque and the rotational speed. In the range shown, hereby, a controlled auto-ignition is possible even with an unfavorable fuel quality. A range for a robust CAI operation for controlled auto-ignition lies, for example, with a rotational speed in the range of 2000-2500 rpm and a torque of 30-60 Nm (with a 1.8 L 4 cylinder engine). These range data and the engine are cited by way of example only and the invention is by no means restricted thereto. In principle, the range for the rotational speed can also be selected smaller or larger than the aforementioned range, the same applies to the range of the torque. The decisive factor is that the range is limited to enable a substantially reliable auto-ignition for a predetermined fuel quality range.

After the start of the engine, the operating point of the vehicle does not normally immediately lie within this range so that the vehicle or its engine first has to be ignited by means of spark ignition, for example by means of spark plugs. However, during the driving, it will be repeatedly asked whether, according to Step S3, the engine has reached a target point which falls within the robust CAI range. As soon as this is established in Step S3, a switchover takes place to CAI operating mode (Steps S4, S5) and hence auto-ignition of the engine occurs. Hereby, after it has first been established in Step S3 that the vehicle has reached a robust CAI target point, coarse adjustment of at least one or more operating parameters takes place in a Step S4 in order further to improve the controlled auto-ignition of the engine in advance.

In order, despite quality differences in the fuel, to achieve a desired or nominal combustion course, the engine control system has to perform a corresponding adjustment or correction of operating parameters. Hereby, at least one suitable operating parameter or a combination of at least two or more operating parameters, such as those listed for example below, can be coarsely adjusted first. Examples of such operating parameters are listed below:

- adjustment of the injection timing and the injection quantity
- lambda variation
- adjustment of the exhaust gas recirculation rate
- adjustment of the prehomogenization in the intermediate compression (pre-injection)
- adjustment of the ignition point
- ignition support from spark plugs with auto-ignition processes
- intake-air preheating/cooling
- adjustment of the control times of variable valve gears
- control of an air pulse valve etc.

The list is by way of example only and not definitive. Hereby, a priori knowledge from conventional driving (homogeneous SI operation) can be determined for the switchover process and the quality of the fuel or the fuel properties in order subsequently to adjust the operating parameters accordingly. The a priori knowledge hereby include parameters such as the antiknock properties of the fuel, the volatility of the fuel, the aforementioned map range for the robust CAI operating mode, the restriction of the fuel quality range with reference to common fuels used, the idle time of the vehicle, the ambient temperature, the time since the last switchover process etc.

The more precise determination of the fuel quality for the adjustment of the operating parameters is hereby described briefly below. In active condition, the knock control system in the spark-ignited SI operation recognizes with the aid of knock sensors, for example, the characteristic high-frequency structure-borne sound oscillations and reacts by retarding the ignition time as soon as a knocking is detected. On the basis of the reference map, which was determined with reference fuel, the degree of the ignition timing retardation is an indicator of the antiknock properties and hence also, for example, of the above-mentioned research octane number RON or the motor octane number MON or the quality of the fuel. In principle, however, any other method is conceivable in order to determine the fuel quality or at least delimit it more precisely. It is also conceivable that the driver, for example, when refueling will enter the octane number himself. Moreover, in addition to the fuel quality, it is also possible to take into account the vapor pressure RVP (Reid vapor pressure) as well in order to adjust the operating parameters suitably in advance. However, this list is cited by way of example only and is not definitive. In principle, the coarse adjustment of the operating parameters involves, before the switchover to the CAI operating mode, taking into account known or existing output variables, such as, for example, the vapor pressure, the fuel quality etc., with which the subsequent CAI operating can be influenced, during the coarse adjustment of operating parameters to the extent that, on the switchover to the CAI operating mode, this is already optimized to the greatest degree possible in advance. In principle, however, it is also possible to skip Step S4 and only perform an adjustment of the operating parameters after the switchover to CAI operating mode as will be described below in Step S6 with reference to the fine adjustment.

After the first coarse adjustment in Step S4 of operating parameters, such as those listed above, for example, in Step S5 the engine is then switched to CAI operating mode. Hereby, it should be noted that this CAI operating mode includes both cases, namely the case in which auto-ignition of the engine takes place without support from an ignition device and also the case in which auto-ignition of the engine takes place with support from an ignition device, such as for example spark plugs.

After the switchover to CAI operating mode (Step S5), the first combustions are analyzed directly afterward in a Step S6, for example with reference to the pressure course, with CAI operation in particular with reference to the pressure gradients after the fuel ignition, and for example the ignition point, the acoustic behavior, the combustion duration, the emission, the fuel quality (ignition performance) etc. evaluated. Hereby, preferably a fine adjustment of at least one or more operating parameters takes place for the further optimization of the auto-ignition process, with at least one or more of the aforementioned parameters, such as for example the established fuel quality being taken into account. Examples of such operating parameters were given above, hereby, for the fine adjustment the same operating parameters can be taken into account as those for the coarse adjustment in Step S5, or also, at least partially, other operating parameters which have an impact on the auto-ignition process of the engine.

The fine adjustment of the operating parameters in Step S6 takes place hereby in such a way that the pressure course, for example, for the respective operating point established is set on the basis of an operating-point-dependent nominal pressure curve from a corresponding map. The operating points at which suitable auto-ignition is possible are validated and stored in a second map, as shown in FIG. 1 (Step S7). This makes it possible to perform auto-ignition not only in the robust CAI range but also in other ranges, as shown in the subsequent second map. Hereby, the fuel quality can be determined in more detail or more precisely than in the coarse adjustment in order to adjust operating parameters appropriately.

Gasoline comprises residual components which are highly volatile to different degrees so that over time portions evaporate and the fuel composition changes. This is in particular encouraged by lengthy idle times of the vehicle and high ambient temperatures. As mentioned above, these parameters are optionally also taken into consideration when the operating parameters are adjusted.

From the run-up behavior of the engine on start-up, the fuel quality detection, as a function in the engine control system, detects the fuel quality and makes corresponding corrections as described below with reference to FIG. 2. Another possibility for the determination of the volatility of the fuel consists, for example, in the selective wetting of a temperature sensor with a defined fuel quantity of a known temperature. The cooling of the sensor element measured hereby is a measure for the volatility of the fuel. This fuel quality and composition are determined during the driving operation quasi online for the optimum control parameters for each operating point and stored in corresponding maps in the engine control system.

A, here second, map of this kind is shown in FIG. 1. In this, as described above, the respective operating parameter is depicted, in dependence on the research octane number RON and the vapor pressure, in the form of a 3D-map. Hereby, simultaneously the respective fuel quality- and composition-dependent (maximum) operating range is depicted for the respective parameters and their operating points. As can be seen in the second map, operating points at which controlled auto-ignition can take place are validated and correspondingly stored for different research octane numbers and vapor pressures (RVP), although the research octane number and/or the vapor pressure (RVP) on their own do not have an optimum value for auto-ignition. However, this is compensated by a corresponding adjustment of the operating parameters in the respective operating point which is adjusted in such a way that, despite an unfavorable research octane number or an unfavorable vapor pressure (RVP), reliable, controlled auto-ignition is possible. Validation of these operating points, at which controlled auto-ignition of the engine can take place and a corresponding storage of these operating points in the second map takes place as described above in Step S7. The operating range is validated by driving technology and the maximum operating range of an operational type or strategy determined in this way. Hereby, the determination takes place preferably online during the driving. Hereby, for example, a maximum operating range for the new fuel or a fuel mixture in the tank is demarcated. Since reliable auto-ignition is possible in these operating points, an operating mode switchover is only permitted from validated operating points.

On a new engine start, therefore, it is possible in a Step S2* directly to determine whether the vehicle or the engine is switched to CAI operating mode in that it is determined in a Step S3* with reference to the second map whether or not the vehicle has reached an operating point which is validated. If the operating point is validated, it is possible to switch to CAI operating mode or remain therein insofar that the engine is already in CAI operating mode. If the operating point or target point to be expected is not validated on the switchover, the switchover to CAI operating mode with auto-ignition of the engine is blocked and instead the operating mode with spark ignition of the engine takes place or the operating mode with spark ignition is retained insofar as the engine is already in this operating mode.

FIG. 2 shows a pressure curve analysis such as can be performed in Step S6 in FIG. 1, for example, using the example of a CAI process. The diagram shows a pressure course at full load with spark ignition (SI) and a compression curve. It also shows different pressure curves in a CAI operating mode. This shows, on the one hand, an optimum pressure course with an ideal pressure rise gradient. Also shown are two cases in which the pressure rise in CAI operating mode deviates from the ideal. Hereby, it is necessary to re-adjust or set corresponding operating parameters suitably in order to change the pressure course in such a way that it is brought closer to the ideal pressure course.

In the first case, the pressure rise is too strong, i.e. the pressure rise gradient is too high so that a premature start of combustion occurs and hence there is a risk of engine damage. In the second case, the pressure course is not strong enough, i.e. the pressure rise gradient is too low. This causes the start of combustion to be retarded resulting in inefficient combustion.

In the first case, with a pressure rise gradient which is too high, the following countermeasures can be taken as part of, for example, the fine adjustment in Step S6. For example, the exhaust gas recirculation rate can be correspondingly increased. In addition, the pre-injection quantity can be reduced. In addition, the intake air quantity can be increased. Furthermore, the injection quantity of the air pulse valve can be increased. These measures are only cited by way of example and the list is not definitive. In the second case, in which the pressure rise gradient is too low, the following countermeasures can be taken as part of, for example, the fine adjustment in Step S6. For example, the exhaust gas recirculation rate (EGR rate) can be reduced. It is also possible to increase the pre-injection quantity. In addition, ignition support can be provided by means of spark plugs. It is also possible to reduce the quantity of injected air. However, these are only a few examples of measures that can be taken and the list is not definitive.

As described above, the operating point is stored in the second map for the respective operating parameter. In addition, it also possible for the corresponding fine adjustments to the respective operating point to be stored and, for example, called up when this operating point is reached and this can be followed by a corresponding coarse adjustment of the operating parameters. After the switchover to CAI operating mode, another fine adjustment of operating parameters can be performed, for example as part of the pressure curve analysis and then stored again, as already described above.

According to an embodiment, a method is to be disclosed that evaluates the fuel quality, then optimizes the combustion process of the respective module and permits the reliable determination of the operating range. Hereby, the main advantage of the method lies in the fact that the fuel quality is detected and the new operating mode is immediately adjusted to this so that the desired nominal combustion course is achieved. This is a precondition for an efficient, combustion method optimized with respect to consumption and emissions. The adaptation method or the coarse or fine adjustment demarcates the maximum operating range of each operating mode independently of quality and composition; hereby, switchovers only take place in validated operating points. This makes it possible to prevent a switchover to CAI operating mode taking place in an operating point in which auto-ignition in the engine cannot take place sufficiently reliably.

What is claimed is:

1. An internal combustion engine which can be switched at least between an operating mode with spark ignition of the engine and an operating mode with controlled auto-ignition of the engine, the internal combustion engine being operable:

to provide a first map in which at least one range is specified in which auto-ignition of the engine can take place, to determine whether, after an engine start, the engine reaches an operating point lying in the range of the first map, in which a controlled auto-ignition can take place, and to switch the engine to the operating mode, in which the auto-ignition can take place when the operating point lies in this range of the first map.

2. A method for changing the operating mode of an internal combustion engine from an operating mode in which a spark ignition of the engine takes place into an operating mode in which auto-ignition of the engine takes place, the method comprising the steps of:

a) providing a first map in which at least one range is specified in which auto-ignition of the engine can take place, b) determining whether, after an engine start, the engine reaches an operating point lying in the range of the first map, in which a controlled auto-ignition can take place, and c) switching the engine to the operating mode, in which the auto-ignition can take place when the operating point lies in this range of the first map.

3. The method according to claim 2, wherein a reference map is provided for at least one reference fuel with a data supply from operating ranges of at least one or substantially all operating modes in order to draw conclusions regarding the fuel quality of the fuel in the tank.

4. The method according to claim 2, wherein a pressure curve analysis is performed after the engine has switched to the operating mode in that auto-ignition of the engine can take place.

5. The method according to claim 2, wherein in the first combustion or in several of the first combustions after the switchover into the operating mode in which auto-ignition of the engine can take place, one or more parameters selected from the group consisting of the pressure course, the pressure gradient, the ignition point, the acoustic behavior, the combustion duration and the emissions are determined in order to draw conclusions therefrom regarding the fuel quality or fuel properties.

6. The method according to claim 2, wherein the fuel quality and/or fuel composition is determined online for the adjustment of operating parameters of operating points during driving and stored in corresponding maps in the engine control system so that a corresponding operating range for a existing fuel can be created.

7. The method according to claim 2, wherein the operating mode in which auto-ignition can take place is, for example, a CAI operating mode.

8. The method according to claim 2, wherein a reference map is provided for at least one reference fuel with substantially a complete data supply from operating ranges of at least one or substantially all operating modes in order to draw conclusions regarding the fuel quality of the fuel in the tank.

9. The method according to claim 2, wherein in the first map, the range for the operating mode in which auto-ignition of the engine can take place is selected in such a way that an operating point of the engine in this range ensures sufficient switchover reliability and optionally comprises a stable engine operation for a predetermined fuel quality range.

10. The method according to claim 9, wherein, after refueling a vehicle, the fuel quality of the fuel in the tank is determined in dependence on the quantity and quality of the newly filled fuel and any residual fuel in the tank.

11. The method according to claim 2, wherein a switchover into the operating mode in which auto-ignition of the engine can take place, takes place under the aspect of the driving comfort.

12. The method according to claim 11, wherein the switchover into the operating mode is virtually or substantially completely imperceptible to a driver.

13. The method according to claim 2, wherein a coarse adjustment of at least one or more operating parameters takes place when an operating point of the engine falls within the range of the first map in which a controlled auto-ignition of the engine can take place.

14. The method according to claim 13, wherein the coarse adjustment of the operating parameters takes place on one or more parameters selected from the group consisting of:

the antiknock properties of the fuel, the volatility of the fuel, the fuel quality in the tank after a refueling process, the idle time of the vehicle, the ambient temperature, the time since the last switchover process, and the range for operating points in which a controlled auto-ignition is possible.

15. The method according to claim 13, wherein as operating parameters in the coarse adjustment and/or the fine adjustment one or more operating parameters can be adjusted, wherein the one or more operating parameters are selected from the group consisting of: the adjustment of the injection timing and the injection quantity, the lambda variation, the adjustment of the exhaust gas recirculation rate, the adjustment of the prehomogenization in the intermediate compression, the adjustment of the ignition point, the ignition support by at least one or more spark plugs during the auto-ignition, the intake-air preheating and intake-air precooling, and the adjustment of the control times of variable valve gears and the control of air pulse valves.

16. The method according to claim 13, wherein the operating parameters are derived from the operating mode with spark ignition.

17. The method according to claim 2, wherein a fine adjustment of at least one or more operating parameters takes place after the engine has switched to the operating mode in that auto-ignition of the engine can take place.

18. The method according to claim 17, wherein during the fine adjustment of at least one or more operating parameters selected from the group consisting of: the idle time of the vehicle, the ambient temperature and the time since the last switchover process are taken into account.

19. The method according to claim 17, wherein a current operating point at which a fine adjustment of at least one operating parameter has taken place and at which auto-ignition of the engine can take place is validated and stored in a second map.

20. The method according to claim 19, wherein a changeover to the operating mode in which auto-ignition of the engine can take place can only take place in a validated operating point or an operating point which falls in a prespecified range in which auto-ignition of the engine can take place.

* * * * *